(No Model.)  3 Sheets—Sheet 1.
R. A. PANCHAUD & W. G. TEMPLE.
APPARATUS FOR DISPENSING LIQUIDS.

No. 476,760. Patented June 7, 1892.

(No Model.) 3 Sheets—Sheet 2.

R. A. PANCHAUD & W. G. TEMPLE.
APPARATUS FOR DISPENSING LIQUIDS.

No. 476,760. Patented June 7, 1892.

(No Model.) 3 Sheets—Sheet 3.

R. A. PANCHAUD & W. G. TEMPLE.
APPARATUS FOR DISPENSING LIQUIDS.

No. 476,760. Patented June 7, 1892.

UNITED STATES PATENT OFFICE.

ROBERT A. PANCHAUD AND WILLIAM G. TEMPLE, OF LONDON, ENGLAND; SAID TEMPLE ASSIGNOR TO SAID PANCHAUD.

APPARATUS FOR DISPENSING LIQUIDS.

SPECIFICATION forming part of Letters Patent No. 476,760, dated June 7, 1892.

Application filed February 23, 1892. Serial No. 422,481. (No model.)

*To all whom it may concern:*

Be it known that we, ROBERT AUGUSTUS PANCHAUD, secretary, residing at 43 Great Tower Street, in the city of London, and WILLIAM GEORGE TEMPLE, mechanic, residing at 80 Malden Road, London, in the county of Middlesex, England, subjects of the Queen of Great Britain and Ireland, have invented certain Improvements in Apparatus for Drawing Off or Dispensing Aerated Liquids, of which the following is a specification.

This invention relates to apparatus for drawing off or dispensing aerated liquids in which the aerated liquid is drawn from the main reservoir into an intermediate vessel from which gas-pressure is then relieved, and then the contents of the said intermediate vessel are drawn off at a reduced pressure into a glass or vessel for consumption.

The object of this invention is to utilize the pressure in the aerated liquid itself when first introduced from the main reservoir to the intermediate vessel to effect the closure of the said intermediate vessel, after which the communication between the main reservoir and the intermediate vessel is closed, and then the pressure in the said vessel is reduced by allowing a portion of the gas to escape, and then the outlet from the intermediate vessel automatically opens to discharge the contents thereof.

We will describe, with reference to the accompanying drawings, what we consider the best method of carrying this invention into effect, premising, however, that we do not limit ourselves to the precise details shown.

Figure 1:
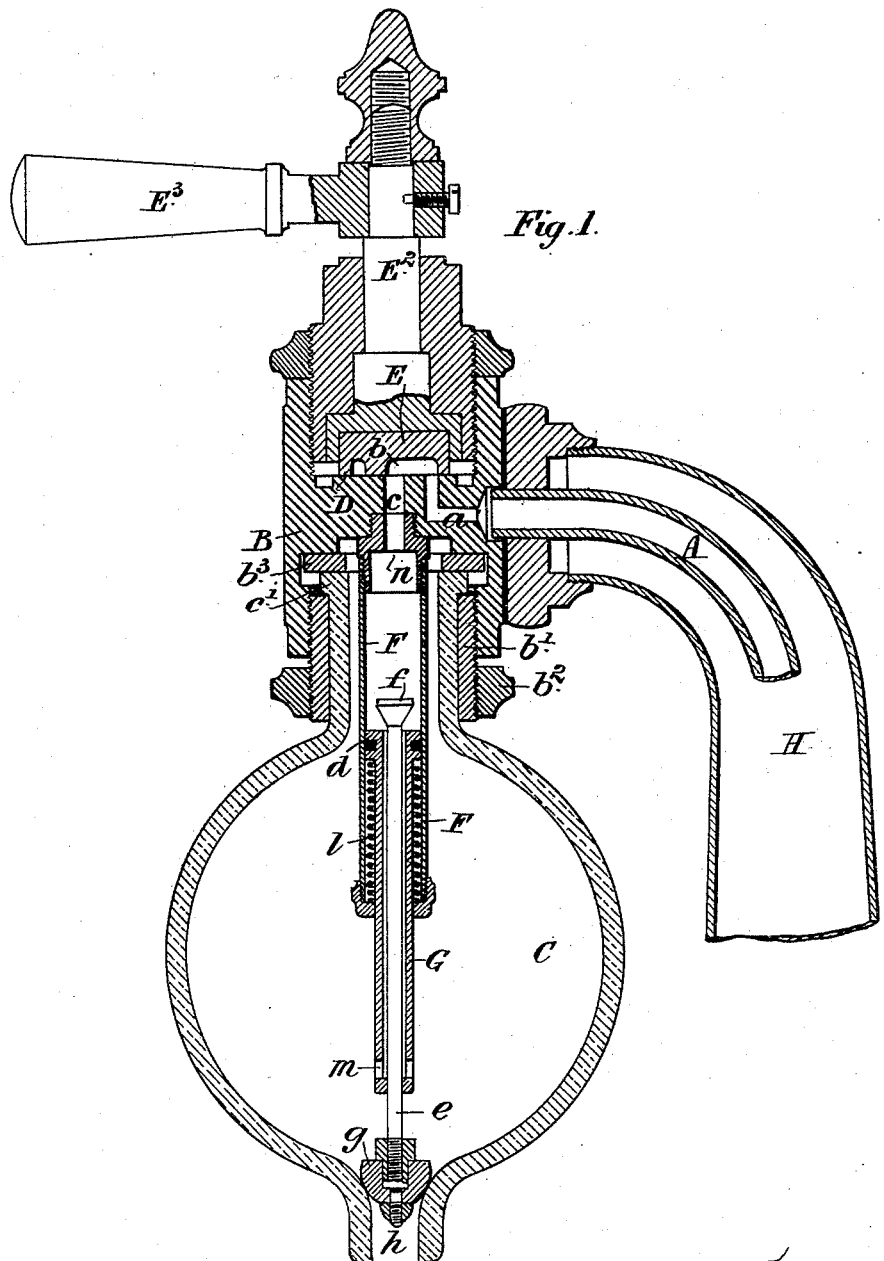
Figure 2:
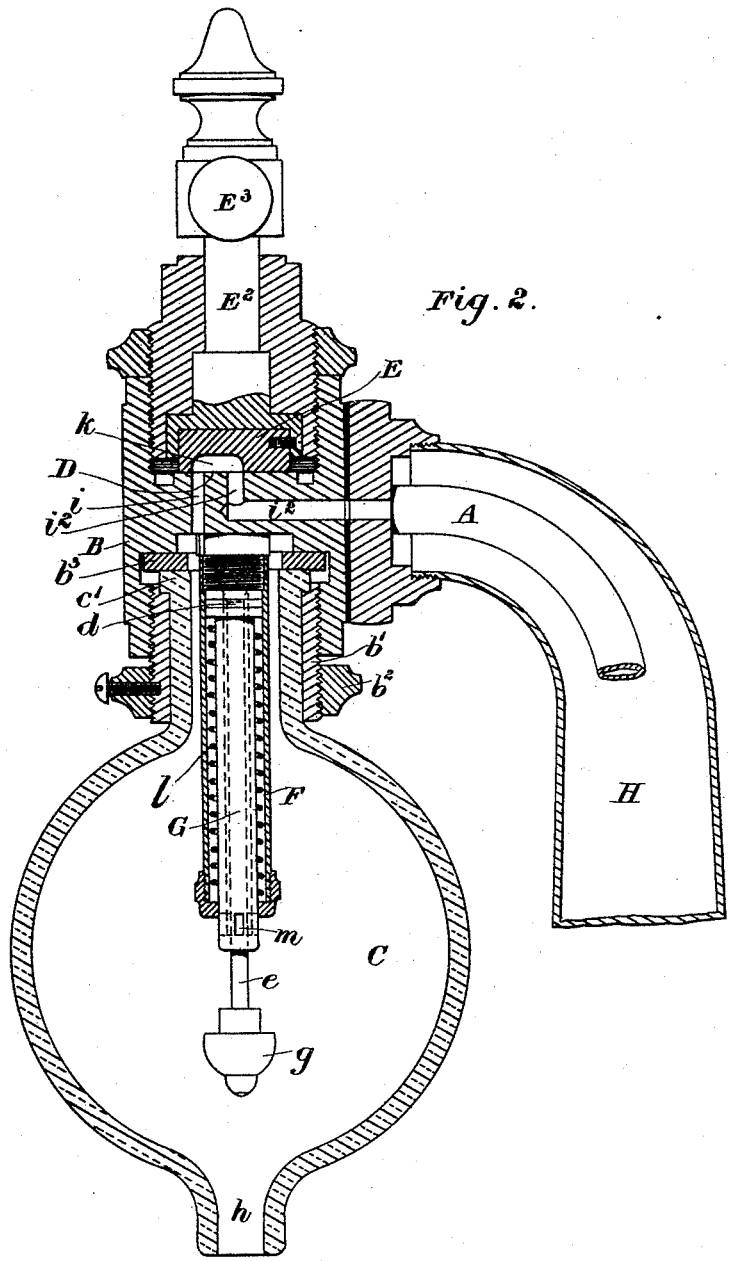
Figure 3:
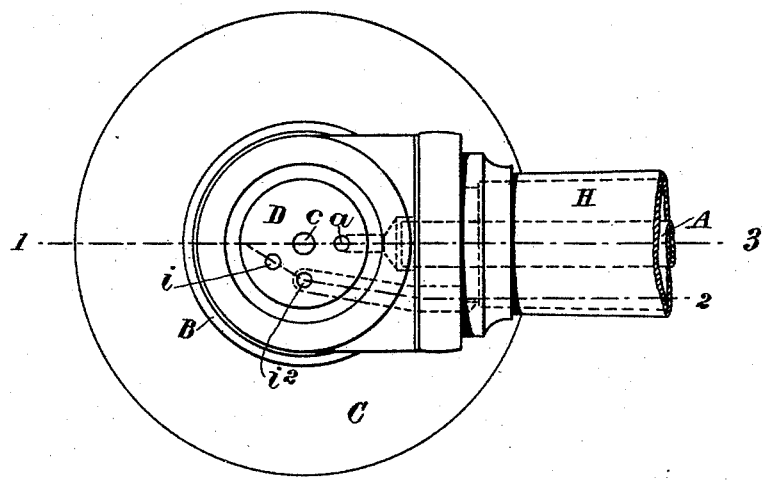
Figure 4:
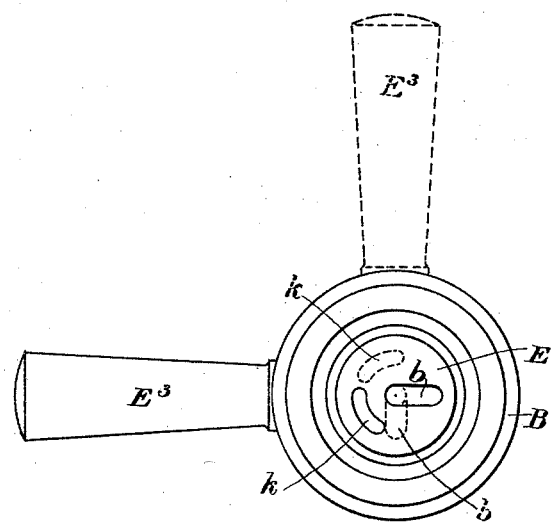

Figure 1 is a vertical section (on the line 1 3, Fig. 3) of an apparatus constructed according to our invention, the parts being shown in the positions which they occupy when the liquid under pressure is being admitted to the intermediate vessel. Fig. 2 is a vertical section taken along the line 1 2 in Fig. 3, the parts being shown in the position they occupy when the intermediate vessel is empty or being discharged. Fig. 3 is a plan of the valve-box, the valve being removed so as to show the passages in the valve-seat; and Fig. 4 is a face view of the valve, showing the ports or passages therein.

A is a pipe communicating with the reservoir (not shown in the drawings) and opening into the valve-box B, to which the intermediate vessel C may be attached by the screw-collar $b'$ and lock-nut $b^2$, by which the flange $c'$ is pressed against the washer $b^3$, as shown, or in any other convenient way. The pipe A communicates with the passage $a$ in the valve-seat D, which passage, when the valve E is in the position shown in Fig. 1, communicates by a radial passage $b$ in the valve E with a passage $c$ in the valve-seat and leading to the interior of the vessel C.

Connected to the under side of the valve-seat and communicating with the passage $c$ is a tube or cylinder F, containing a piston $d$, provided with a hollow piston-rod G, through which and through the piston passes a rod or stem $e$, which passes loosely through the passage in the said piston and piston-rod, a space being left between the stem $e$ and the interior of the hollow rod G and piston $d$ for the passage of liquid, as hereinafter described. The stem $e$ is provided at its upper end with a valve $f$, which normally closes the passage through the piston and piston-rod, and carries at its lower end a plug or stopper $g$ for closing the outlet from the vessel C. When the vessel C is empty and the valve E is in the position shown in Fig. 2, liquid cannot enter the said vessel C, and the piston $d$ and valve $f$ are maintained by the spring $l$ at the upper end of the cylinder F, as shown in Fig. 2, the valve $f$ being closed upon its seat in the said piston $d$. When the valve E is in this position, the interior of the vessel C is in communication with the external atmosphere by passages $i$ $i^2$ in the valve-seat D, connected together by the passage $k$ in the valve E, the passage $i$ leading to the interior of the vessel and the passage $i^2$ being open to the atmosphere. The spindle $E^2$ of the valve E is provided with a handle $E^3$, by which the valve may be turned in the direction and to the extent required. When the handle $E^3$ is turned into the position shown in Fig. 1, the liquid under pressure will pass from the reservoir through the pipe A and passages $a$, $b$, and $c$ into the cylinder F, and the pressure thereof, by acting on the piston $d$ and its valve $f$, will cause them to descend, thereby compressing the spring $l$ and forcing the plug or stopper $g$ into the discharge-opening $h$ of the vessel C. The pressure, still acting on the piston $d$, causes it to descend still farther, it then sliding independently of the stem $e$ away from the valve $f$, thereby opening the passage in the piston $d$ and piston-rod G, through which passage the liquid will pass and through openings $m$ in the lower end of the piston-rod into the vessel C until the vessel has filled or has received its required supply.

To deliver the liquid from the vessel C for consumption, a glass or other suitable receptacle is placed beneath the discharge-opening $h$ and the valve E is turned by means of the handle $E^3$ into the position shown in Fig. 2, so as to cause the passage $k$ in the valve to connect the passage $i$ $i^2$, and the passage $a$ to be closed by a solid portion of the valve, so that the communication between the reservoir and vessel C is cut off and gas-pressure above the liquid in the vessel C is allowed to escape into the atmosphere through the passages $i$, $k$, and $i^2$. The pressure in the vessel being thus reduced, the piston $d$, under the action of the spring $l$, rises in the cylinder F, and, coming into contact with the valve $f$, lifts the rod $e$ and raises the plug $g$ out of the discharge-opening $h$. The liquid will then flow from the vessel C at the required reduced pressure into the receptacle placed in position to receive it in a sparkling and fresh condition and without undue splashing.

In the upper end of the cylinder F or in the nozzle by which it is connected to the valve-seat D is a small opening $n$, through which the liquid contained in the cylinder F above the piston $d$ passes into the vessel C as the piston rises in the cylinder. The apparatus may be fixed to a counter or other suitable support, and the pipe leading to the reservoir may be inclosed in a tubular bracket H, as shown, or be otherwise concealed.

The foregoing arrangement provides a large passage for the liquid to the intermediate vessel after the valve $g$ is closed. The arrangement can be simplified without, however, the advantage of the said large passage if the piston be made solid and its rod be provided with the valve $g$, a hole, as at $n$, affording a passage for the liquid under pressure from the cylinder F to the vessel C, the said hole being sufficiently large for the purpose, but not so large as the inlet-passage $a$ $b$ $c$, so that the liquid is admitted to the cylinder F at a greater rate than that at which it passes therefrom by the hole $n$, and therefore the requisite pressure is obtained to close the valve $g$.

We claim—

1. In apparatus for drawing off or dispensing aerated liquids, the combination, with an intermediate vessel in communication with a main reservoir and having an outlet-port therein, of a valve operated by the pressure in the aerated liquid to close said outlet-port, substantially as described.

2. In an apparatus for drawing off or dispensing aerated liquids, the combination, with an intermediate vessel in communication with a main reservoir and having an outlet-port therein, of a valve for closing said port operated by the pressure in the aerated liquid in the intermediate vessel, and means for automatically opening said valve upon the reduction of the pressure in the intermediate vessel, substantially as described.

3. The combination, with an intermediate vessel in communication with a main reservoir and having an outlet-port, of means for opening and closing the communicating passage between the main reservoir and intermediate vessel, a tube or cylinder in the intermediate vessel, and a piston in the tube or cylinder operated by the pressure in the aerated liquid to close the outlet port of the intermediate vessel, substantially as described.

4. In apparatus of the kind hereinbefore mentioned, the combination, with means for opening and closing communication between the main reservoir and the intermediate vessel and for opening and closing communication between the interior of the intermediate vessel and the exterior or outer air, of a tube or cylinder in the intermediate vessel fitted with a hollow sliding piston and tubular piston-rod, and a stem extending through the piston and tubular rod and carrying at its upper end a valve for closing and opening the passage through the piston-rod and at its lower end a plug or stopper for closing and opening the outlet from the intermediate vessel, substantially as hereinbefore described.

5. The combination, with the intermediate vessel in communication with a main reservoir and having an outlet-port, of a valve in the communicating passage for alternately connecting the interior of the intermediate vessel with the main reservoir and with the atmosphere, a tube or cylinder in the intermediate vessel into which the communicating passage discharges, a piston in said cylinder, a hollow piston-rod having openings at its outer end communicating with the interior of the intermediate vessel, a valve-stem in said hollow piston-rod, a valve on one end of the valve-stem for closing the inner end of the hollow piston-rod, and a valve on the other end for closing the outlet-port of the intermediate vessel, substantially as described.

In testimony whereof we have signed our names to this specification in the presence of two subscribing witnesses.

R. A. PANCHAUD.
W. G. TEMPLE.

Witnesses:
 EDWD. GEO. DAVIES,
  47 *Lincoln Inn Fields, London, W. C.*
 PERCY R. JOEDRIME,
  9 *Birchin Lane, London, E. C.*